(12) United States Patent
Wolf et al.

(10) Patent No.: US 6,406,763 B1
(45) Date of Patent: Jun. 18, 2002

(54) POST PASTEURIZATION MULTILAYERED FILM

(75) Inventors: John R. Wolf, Taylors; George D. Wofford, Duncan; Blaine C. Childress, Inman, all of SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/472,082

(22) Filed: Dec. 23, 1999

(51) Int. Cl.$^7$ .............................................. B29D 22/00
(52) U.S. Cl. ..................... 428/34.9; 428/35.4; 428/36.6; 428/36.7; 428/213; 428/214; 428/215; 428/216; 428/336; 428/474.4; 428/514; 428/515; 428/516; 428/520; 426/112; 426/113; 426/127; 426/392; 426/407; 426/412
(58) Field of Search ................................. 428/514, 515, 428/516, 520, 213–216, 336, 36.6, 36.7, 35.4, 34.9, 474.4; 426/113, 112, 127, 392, 407, 417

(56) References Cited

U.S. PATENT DOCUMENTS

| | | | |
|---|---|---|---|
| 4,391,862 A | 7/1983 | Bornstein et al. | 428/34.8 |
| 4,448,792 A | 5/1984 | Schirmer | 426/113 |
| 4,469,742 A | 9/1984 | Oberle et al. | 428/215 |
| 4,863,769 A | 9/1989 | Lustig et al. | 428/34.9 |
| H762 H | 4/1990 | DeMasi et al. | 426/112 |
| 5,336,549 A | 8/1994 | Nishimoto et al. | 428/213 |
| 5,358,791 A | 10/1994 | Johnson | 428/516 |
| 5,523,136 A | 6/1996 | Fischer et al. | 428/35.2 |
| 5,703,187 A | 12/1997 | Timmers | 526/282 |
| 5,759,648 A | * | 6/1998 | Idlas |

FOREIGN PATENT DOCUMENTS

| | | |
|---|---|---|
| JP | 58-175658 | 10/1983 |
| JP | 60-232948 | 11/1985 |
| WO | WO99/44823 | * 10/1998 |
| WO | 99/44823 | 9/1999 |
| WO | 99/44824 | 9/1999 |
| WO | WO99/44824 | * 10/1999 |

\* cited by examiner

*Primary Examiner*—Leszek Kiliman
(74) *Attorney, Agent, or Firm*—Daniel B. Ruble

(57) ABSTRACT

A multilayer, heat-shrinkable food packaging film useful for forming a post packaging pasteurization bag. The film includes at least three layers: 1) a first outer layer formed from a resin composition having a Vicat softening point of at least 100° C., 2) a second outer layer having one or more thermoplastic gloss materials of polyester, ethylene/alpha-olefin copolymer having a melt index of greater than 1 g/10 minutes, styrene/butadiene block copolymer, and ethylene/styrene random copolymer, and 3) one or more inner layers between the first and second outer layers. At least one of the inner layers includes an ethylene/alpha-olefin copolymer. The film has a total free shrink of at least 40% at 85° C. If the second outer layer includes polyester, then each of the inner layers of the multilayer film is devoid of a weight amount of polyamide or polyester greater than the weight amount of polyester in the second outer layer. The second outer layer may include sufficient thermoplastic gloss material to impart a gloss of greater than 60%. The film may also include an oxygen barrier internal layer. A post pasteurization bag made from the inventive film provides the appearance and shrink characteristics comparable to those of a barrier bag film yet can form heat seals that withstand the abuse and heat associated with post pasteurization.

33 Claims, No Drawings

POST PASTEURIZATION MULTILAYERED FILM

BACKGROUND OF THE INVENTION

The present invention relates to multiple layer films for food packaging, and more particularly to films that are useful for packaging food products to be pasteurized after packaging.

There are generally two types of heat shrinkable bags for packaging processed (i.e., cooked) food products: i) barrier bags and ii) cook-in bags. A "barrier bag" protects a food product (e.g., meat) that is cooked before packaging. The barrier bag protects the product from spoilage and contamination and prevents leakage of the packaged product's juice or liquid. The barrier bag may also display printed information regarding the packaged product. The barrier bag is sealed and usually heat shrunk tightly about the cooked product. Accordingly, the thermoplastic film from which the barrier bag is made (i.e., the "barrier bag film") is heat shrinkable, having a high total free shrink. Further, the barrier bag film is preferably capable of quickly forming a heat seal that will hold at or below the heat shrinking temperature. The barrier bag film also presents pleasing optical characteristics (i.e., high gloss and low haze). For example, a widely used barrier bag film sold by Sealed Air Corporation under the B620 product code has typical values of about 66% total free shrink, 5.7% haze, and 78% gloss.

Alternatively, a "cook-in bag" protects a food product that is cooked while packaged. In this process, an uncooked food product is heat sealed within a cook-in bag formed from a thermoplastic film (i.e., "cook-in film"). The cook-in film is designed to maintain heat seal integrity, resist delamination, and maintain acceptable optical properties (e.g., gloss, low haze, and clarity) during and after exposure to the cook-in conditions. In a typical cook-in process, the cook-in bag is immersed in hot water or a steam-heated environment for a period of time to cook the packaged product to the desired level. During cooking, the cook-in film is also subjected to abuse, for example rubbing against the walls of a metal container that holds the hot water in which the cook-in bag is immersed. Cook-in time and temperature conditions typically involve a long, slow cook—for example, submersion in hot water at about 55° C. to 65° C. for about 1 to about 4 hours. Submersion in water or steam at 70° C. to 100° C. for up to 12 hours is also possible. Cook-in films are also heat shrinkable so that the heat exposure step shrinks the cook-in bag tightly about the product. Examples of cook-in bag and film constructions are disclosed, for example, in U.S. Pat. No. 4,469,742 issued Sep. 4, 1984 to Oberle entitled "Pasteurizable, Cook-In Shrink Film," which is incorporated herein in its entirety by reference.

However, even a food product cooked in a cook-in bag may eventually be packaged in a barrier bag. This is because a processor may desire to remove the cook-in bag from the cooked food product to further process the cooked food product. For example, the processor may wish to apply a food modifier or slice the packaged food into smaller portions. Food modifiers are used to impart seasoning, color, flavor, glazing, or pleasing odor to the outer surface of the cooked food product. This further processing typically requires stripping the cook-in film from the cooked food product, applying the modifier to the surface of the food product, and then repackaging the modified food product in a barrier bag. The packaged food is then refrigerated for shipment to a retailer, who stores or displays the packaged product until sale to the consumer.

The cooking process—either before the food product is packaged in a barrier bag or while the food product is packaged in a cook-in bag—typically kills or significantly reduces the population of undesirable microorganisms such as the listeria organism that may contaminate the food product. However, the handling of cooked food before it is eventually sealed within a barrier bag may reintroduce undesirable microorganisms to at least the surface of the cooked food.

To return the handled, cooked food product to a safe condition for consumption, a processor may expose the packaged food to a heat treatment to reduce the bacterial load that was reintroduced to the surface of the food product after cooking. This heat treatment subsequent to packaging is known as "post packaging pasteurization" or simply "post pasteurization." Post pasteurization typically involves submersion of the packaged product in hot water (160° F. to 205° F.; i.e., 71° C. to 96° C.) for from about 30 seconds to about 10 minutes. See, for example U.S. Statutory Invention Registration H1762 to DeMasi entitled "Post-Pasteurization," which is incorporated herein in its entirety by reference.

However, a barrier bag often does not withstand the exposure to post pasteurization conditions without failure of the heat sealed seams or delamination of the barrier bag film. To overcome this problem, the processor may package or repackage the cooked food product in a cook-in bag to survive the post pasteurization conditions. A cook-in bag will not fail under post-pasteurization conditions—which typically are much less rigorous than the cook-in conditions for which a cook-in bag is designed. However, cook-in bag films have several disadvantages compared to barrier bag films. Cook-in bags typically cost more, display poorer presentation characteristics (e.g., gloss, haze, and clarity), and possess lower heat shrink capability.

SUMMARY OF THE INVENTION

The aforementioned problems are overcome in the present invention of a post pasteurization film. More specifically, the multilayer heat-shrinkable film includes a first outer layer formed from a resin composition having a Vicat softening point of at least 100° C. The film includes a second outer layer having one or more thermoplastic gloss materials selected from polyester, ethylene/alpha-olefin copolymer having a melt index of greater than 1 g/10 minutes, styrene/butadiene block copolymer, and ethylene/styrene random copolymer. The film also includes one or more inner layers between the first and second outer layers. At least one of the inner layers includes an ethylene/α-olefin copolymer. The film has a total free shrink of at least 40% at 85° C. If the second outer layer includes polyester, then: i) each of the inner layers of the multilayer film is devoid of a weight amount of polyamide greater than the weight amount of polyester in the second outer layer and ii) each of the inner layers of the multilayer film is devoid of a weight amount of polyester greater than the weight amount of polyester in the second outer layer.

In preferred embodiments, the second outer layer includes an amount of the thermoplastic gloss material sufficient to impart a gloss of greater than 60%. The film may also include an oxygen barrier internal layer. Also preferably, the film includes at least one layer that is cross-linked.

The film of the present invention may be used to form a food package or bag suitable for post pasteurization. Such a bag may be used in a method of post pasteurization, in which the processor: i) forms a bag from the inventive film, ii)

encloses a food product within the bag to create a packaged food product, and iii) exposes the packaged food product to conditions sufficient to pasteurize at least the surface of the packaged food product to a desired level.

Such a bag may also be used in a method for imparting a food modifier to a cooked food product. In such case, a processor: i) encloses a food product in a cook-in bag to form a packaged food product, ii) at least partially cooks the packaged food product in the cook-in bag to form a cooked food product, iii) removes the cook-in bag from the cooked food product, iv) applies a food modifier to the cooked food product to form a modified, cooked food product, v) forms a post-packaging pasteurization bag from the inventive film, vi) encloses the modified, cooked food product within the post-packaging pasteurization bag to create a packaged modified cooked food product, and vii) exposes the packaged, modified cooked food product to conditions sufficient to pasteurize at least the surface of the packaged modified cooked food product to a desired level.

A post packaging pasteurization food packaging bag made from the film of the present invention provides the appearance and shrink characteristics comparable to those of a barrier bag film. However, in contrast to typical barrier bag films, the film of the present invention can form heat seals that withstand the abuse and heat associated with post pasteurization without breaking or failing. For example, the heat seals may withstand exposure to at least 100° C. for at least 10 minutes under agitation without failure. The film's shrink attributes allow a bag formed from the film to shrink tightly about a food product to present a pleasing appearance.

These and other objects, advantages, and features of the invention will be more readily understood and appreciated by reference to the detailed description of the invention.

DETAILED DESCRIPTION OF THE INVENTION

The multilayer film of the present invention includes at least three layers: a first outer layer, a second outer layer, and at least one internal (or inner) core layer. One or more barrier and tie layers may be disposed between the outer layers. The film may be formed into a bag, for example, a bag suitable for post packaging pasteurization of a food product. In forming a bag, the first outer film layer may be sealed to itself to form the heat seal seams of the bag. In this manner, the first outer layer or "heat seal layer" of the film is considered the "inside" or food-side layer of the film and the bag made from the film. The second outer layer is considered the "outside" layer or an "abuse layer" of the film or bag.

Heat Seal Layer

The first outer layer of the multilayer film is a heat seal layer that is preferably capable of allowing the multilayer film to form a heat seal to itself—such that the heat seal withstands exposure to simulated post pasteurization conditions of immersion in a liquid of at least 100° C. for at least 10 minutes, preferably at least 20 minutes, without failure. The heat seal layer may include one or more thermoplastic polymers including polyolefins (e.g., ethylene homopolymers, such as high density polyethylene ("HDPE") and low density polyethylene ("LDPE"), ethylene copolymers, such as ethylene/alpha-olefin copolymers ("EAOs"), propylene/ethylene copolymers, and ethylene/vinyl acetate copolymers), polyamides, polyesters, polyvinyl chlorides, and ionomers. The heat seal layer is formed from a resin composition that has a Vicat softening temperature preferably of at least (in ascending order of preference) 100° C., 1 0° C., and 120° C. All references to "Vicat" values in this application are measured according to ASTM 1525 (1 kg), which is incorporated herein in it entirety by reference.

Useful ethylene/alpha-olefin copolymers for the composition of the first outer layer include one or more of medium density polyethylene ("MDPE"), for example having a density of from 0.93 to 0.94 g/cm3, linear medium density polyethylene ("LMDPE"), for example having a density of from 0.926 to 0.94 g/cm3, linear low density polyethylene ("LLDPE"), for example having a density of from 0.920 to 0.930 g/cm3, very low density polyethylene ("VLDPE") and ultra low density polyethylene ("ULDPE"), for example having density below 0.915 g/cm3, and homogeneous ethylene/alpha-olefin copolymers, for example metallocene-catalyzed linear ethylene/alpha-olefin copolymers.

Homogeneous EAOs include ethylene/alpha-olefin copolymerization reaction products of relatively narrow molecular weight distribution and relatively narrow composition distribution. Homogeneous EOAs are structurally different from heterogeneous EOAs in that homogeneous EOAs exhibit: i) a relatively even sequencing of comonomers within a chain, ii) a mirroring of sequence distribution in all chains, and iii) a similarity of length of all chains (i.e., a narrower molecular weight distribution). Furthermore, homogeneous EOAs are typically prepared using metallocene, or other single-site type catalysts, rather than using Ziegler Natta catalysts. Single-site catalysts typically have only one type of catalytic site, which is believed to be the basis for the homogeneity of the polymers resulting from the polymerization. Homogeneous EOAs have molecular weight distributions, expressed as Mw/Mn, of less than about 4, preferably less than about 3, still more preferable less than 2.5, most preferably less than about 2.0. Homogeneous EAOs include long chain branched, linear, and bimodal composition, such as interpenetrating networks (IPN) resins. Homogeneous EAOs may be prepared by solution (preferred), gas phase, supercritical fluid phase, or slurry polymerization. IPNs may be prepared using tandem or mixed catalyst processes.

The comonomer of an ethylene/alpha-olefin copolymer may be selected from $C_3$ to $C_{10}$ alpha-olefins. The ethylene/alpha-olefin copolymer may include at least about 80 weight percent ethylene and less than about 20 weight percent alpha-olefin, preferably at least about 85 weight percent ethylene and less than about 15 weight percent alpha-olefin, more preferably at least about 90 weight percent ethylene and less than about 10 weight percent alpha-olefin.

Particularly preferred copolymers for the first outer layer include propylene/ethylene copolymers ("EPC"), which are copolymers of propylene and ethylene having an ethylene comonomer content of less than 10%, preferably less than 6%, and more preferably from about 2% to 6% by weight. The major component of the first outer layer may be blended with other components. For example, EPC as a major component of the first outer layer may be blended with polypropylene (PP), in which case the layer preferably includes between about 96% and 85% EPC and between about 4% and 15% PP, more preferably at least 92% EPC and less than 8% PP.

Other useful components for the first outer layer include. i) copolymers of ethylene and vinyl acetate ("EVA") having vinyl acetate levels of from about 5 to 20 weight %, more preferably from about 8 to 12 weight %, ii) acrylate and methacrylate (collectively, "(meth)acrylate") polymers such as ethylene/(meth)acrylic acid ("EMAA"), ethylene/acrylic acid ("EAA"), ethylene/n-butyl acrylate ("EnBA"), and the salts of (meth)acrylic acid copolymers ("ionomers"). The first outer layer may further include one or more of additives such as antiblock and antifog agents, or may be devoid of such agents.

The thickness of the first outer layer is selected to provide sufficient material to effect a strong heat seal, yet not so thick so as to negatively affect the manufacture (i.e., extrusion) of the multilayer film by lowering the melt strength of the film to an unacceptable level. The first outer layer may have a thickness of from about 0.05 to about 6 mils (1.27 to 152.4 micrometer), more preferably from about 0.1 to about 4 mils (2.54 to 101.6 micrometer), and still more preferably from about 0.5 to about 4 mils (12.7 to 101.6 micrometer). Further, the thickness of the first outer layer as a percentage of the total thickness of the multilayer film may range (in ascending order of preference) from about 1 to about 50 percent, from about 5 to about 45 percent, from about 10 to about 45 percent, from about 15 to about 40 percent, from about 15 to about 35 percent, and from about 15 to about 30 percent.

Outside Abuse Layer

As an outside abuse layer, the second outer layer may be exposed to environmental stresses once the film is formed into a bag. Such environmental stresses include abrasion and other abuse during processing, post pasteurization, and shipment. The second outer layer preferably also provides heat-resistant characteristics to the film to help prevent "burn-through" during heat sealing. This is because in forming a bag by conductance heat sealing the film to itself—the first outer layer of the film (i.e., inside layer of the bag) is placed in contact with itself and the second outer layer (i.e., outside layer of the bag) contacts the heated metal jaws of a heat sealing apparatus. The heat seal jaws transfer heat through the second outer film layer to the inside layer of the bag to soften the first outer film layer and form the heat seal.

Further, the second outer layer—as an outside abuse layer—is of primary importance in assuring acceptable appearance characteristics of the bag formed from the film, because the second outer layer forms the visible outside layer of the bag. These appearance characteristics include the gloss, haze, and clarity characteristics of the film, which are discussed below. Further, as the outside layer of the bag, the second outer layer provides the surface upon which the processor typically applies printed information, such as by printing ink. As such, the second outer layer is preferably capable of providing a surface that is compatible with selected print ink systems. Also, the outside layer of the bag preferably provides the bag with resistance to attack from grease or oils to which the bag may be exposed during use.

The second outer layer may include one or more of the following thermoplastic gloss materials: i) polyester, ii) styrene-butadiene copolymer, iii) ethylene/alpha-olefin copolymer, and iv) ethylene/styrene random copolymer. The term "gloss material" is used to indicate a material that imparts the desired gloss attributes to the film layer in which it is incorporated.

In a first embodiment, the second outer layer may include at least 50%, preferably at least 70%, more preferably at least 90% polyester as a thermoplastic gloss material, based on the total weight of the layer. Still more preferably, the second outer layer consists essentially of polyester. The polyester may have either a Vicat softening point or a melting point of at least about (in ascending order of preference) 130° C., 150° C., 170° C., 180° C., 190° C., 200° C. and 240° C. (As used herein, "melting point" or "melt point" of a polymer refers to the peak melting point as determined by Differential Scanning Colorimetry (DSC), ASTM D-3418, with 5° C./minute heating rate.) The polyester may be amorphous. The polyester may be a homopolymer or a copolymer, preferably, the polyester is a copolyester. The polyester may have a terephthalic acid mer content of at least (in ascending order of preference) 70 mole %, 80 mole %, 85 mole %, 90 mole %, and 95 mole %. Examples of suitable polyester include polyethylene terephthalate ("PET") homopolymer, PET copolymer, polyethylene cyclohexenyl,6-diol, polyethylene terephthalate glycol, polyethylene isophthalate, polyethylene naphthalate ("PEN") homopolymer, and PEN copolymer.

Preferably, the second outer layer is no more than 25%, more preferably no more than 15%, most preferably no more than 10%, of the total thickness of the film. Where the second outer layer includes a polyester, such a relatively thin layer for the second outer layer permits the multilayer film to be oriented at a temperature of 100° C. or lower, preferably 95° C. or lower, while providing the desired abuse and appearance properties. Polyester-containing films typically require higher orientation temperatures than those temperatures recited in the previous sentence in order to achieve high amounts of solid state orientation. Because a lower orientation temperature may be used with the present invention, the percent free shrink of the heat shrinkable film of this embodiment may be greater at low use temperatures. For example, the embodiment of the film containing a second outer abuse layer that includes a polyester may have a heat shrink initiation temperature of at least 180° F. (82.2° C.), preferably at least 165° F. (73.9° C.), more preferably at least 140° F. (60° C.). Yet the polyester-containing second outer layer provides the desired gloss, clarity, and abuse resistance. Preferably, this embodiment having a second outer layer including a polyester also includes a tie layer (as discussed below) directly adhered (i.e., directly adjacent) to the second outer layer.

It is typical, where a film contains an external polyester layer, to include an internal layer of polyamide or polyester in order to improve the mechanical strength and stretching processability of the film. See, for example, U.S. Pat. No. 5,336,549 to Nishimoto entitled "Biaxially Oriented Laminated Film"; International Publication No. WO 99/44824 published Sep. 10, 1999 corresponding to U.S. patent application Ser. No. 09/034,410 now abandoned, entitled "Stack-Sealable, Heat-Shrinkable Multilayer Packaging Film" (both of which are incorporated herein in their entirety by reference), and International Publication No. WO 99/44823 published Sep. 10, 1999 corresponding to U.S. patent application Ser. No. 09/034,836 now pending entitled "Heat-Shrinkable Multilayer Packaging Film Comprising Inner Layer Comprising a Polyester" (both of which are incorporated herein in their entirety by reference). In such film constructions, the thickness of the internal layer of polyamide or polyester (or the weight of the polyamide or polyester in the internal layer) is greater than the thickness of the outer polyester layer (or the weight of the polyester in the outer layer). However, the internal layer of polyamide or polyester increases the cost of the film and may negatively affect the clarity of the film.

In the present invention, if the second outer layer of film includes a polyester, then the weight of polyamide (if any) or polyester polymer (if any) in each of the inner layers described below of the multilayer film is less than the weight of polyester in the second outer layer. In other words, each of the inner layers is devoid of an amount by weight of polyamide or polyester greater than the amount of polyester by weight in the second outer layer. Preferably, the total weight of polyamide (if any) in the inner layers of the multilayer film and the total weight of polyester (if any) in the inner layers of the multilayer film are each less than the weight of polyester in the second outer layer. More preferably, the inner layers of the multilayer film are substantially free of polyamide, polyester, or both. Even more preferably, the film is substantially free of polyamide. Further preferably, the internal layers are substantially free of PET, more preferably substantially free of polyester. Also preferably, the film layers other than the second outer layer are substantially free of polyester. "Substantially free" of a material means that the layer or film lacks an amount of the material that would noticeably affect the physical properties of the layer or film (e.g., affect the property by more than 1% of the traditional units used to measure the given property).

In a second embodiment, the second outer layer may include at least 50%, preferably at least 70%, more preferably at least 90% by weight of the layer of thermoplastic styrene-butadiene block copolymer ("SB"). SB may have a styrene comonomer content of less than about 80%, preferably about 75% by weight. Preferred butadiene styrene block copolymers are those of the K-Resin® and DK-Resin® series from Phillips 66 (e.g., KR03, KR04, KR05, KR10, DK11). The melt index of the polymer in the second outer layer of the second embodiment may be at least (in ascending order of preference) 5.0 g/10 minutes, 7.5 g/10 min., 9.5 g/10 min., and 12 g/10 min.

The film having a second outer layer that includes SB may have excellent optical characteristics (e.g., gloss and clarity), high free shrink, and relatively low orientation temperatures, as discussed below. Because SB has a relatively lower glass transition temperature, then a film incorporating a second outer layer of SB may be oriented at a lower temperature so that the film will have a higher level of total free shrink at 85° C. Further, a film of the present invention including an SB-containing second outer layer may lack a tie layer adjacent to the second outer layer, and preferably lacks any internal tie layer. The second outer layer may be directly adjacent to a barrier or bulk layer (discussed below).

In a third embodiment, the second outer layer may include at least 50% by weight of the layer, preferably at least 70%, more preferably at least 90% of an ethylene/alpha-olefin having a melt index ("MI") of greater than 1, preferably at least 1.2, more preferably at least 1.5, and most preferably at least 2.0 g/10 minute. All references to MI values in this application are measured by ASTM D1238 (Condition E), which is incorporated herein in its entirety by reference. The higher melt index material tends to provide higher gloss and improves the processability of the film during extrusion.

In a fourth embodiment, the second outer layer may include at least 50% by weight of the layer, preferably at least 70%, more preferably at least 90% of ethylene/styrene random copolymer ("ES"). The ES may include from about 25 to about 80 weight % styrene. The ES may also exhibit a melt index of from about 0.3 to about 10 g/10 minutes. Further, the ES may be blended with atactic polystyrene if desired to increase the modulus of the layer composition and increase the gloss. ES is described in U.S. Pat. No. 5,703,187 issued Dec. 30, 1997 to Timmers, which is incorporated herein in its entirety by reference.

The second outer layer may have a thickness of from about 0.05 to about 5 mils (1.27 to 127 micrometer), preferably from about 0.3 to about 4 mils (7.62 to 101.6 micrometer), and more preferably from about 0.5 to about 3.5 mils (12.7 to 88.9 micrometer). Other than as noted above with respect to the first embodiment, the thickness of the second outer layer may range as a percentage of the total thickness of the multilayer film of from about (in ascending order of preference) 1 to 50 percent, 3 to 45 percent, 5 to 40 percent, 7 to 35 percent, and 7 to 30 percent.

Core Layers

The film of the present invention includes at least one internal core layer to enhance one or more of the film's shrink, strength, secant modulus, optical, permeation, and abuse-resistance characteristics. The core layer also facilitates stable extrusion and the orientation process used to make film. Preferably, at least one and more preferably all of the internal core layers are cross-linked (e.g., irradiated) as discussed below. Each core layer may include at least 50%, preferably at least 70%, more preferably at least 90% by weight of the layer of one or more ethylene/alpha-olefin copolymers, such as those discussed above in conjunction with the seal layer. Preferably, the ethylene/alpha-olefin copolymer has a density of between about 0.89 and 0.93 g/cm3, more preferably the ethylene/alpha-olefin copolymer is a VLDPE. Suitable ethylene/alpha-olefin copolymers for the internal core layers are described in U.S. Pat. No. 4,863,769 to Lustig, which is incorporated herein in its entirety by reference.

The core layer may be directly adhered to the first outer layer and disposed between the first outer layer and a barrier layer (discussed below), in which the case core layer is the first internal layer and the barrier layer (if present) is the second internal layer. A film according to the present invention may also include multiple internal core layers of the type described above. Additional core layers may be of different or essentially identical composition and thickness. A preferred construction includes two core layers substantially identical in composition and thickness that are disposed on either side of an internal barrier layer to form a "balanced" film construction.

Preferably, at least one core layer has a thickness of (in ascending order of preference) from about 0.05 to about 12 mils (1.27 to 304.8 micrometer), from about 0.5 to about 12 mils (12.7 to 304.8 micrometer), and from about 1.0 to about 12 mils (25.4 to 304.8 micrometer). Further, the thickness of the core layer may be (in ascending order of preference) from about 15 to about 70 percent, from about 25 to about 60 percent, from about 30 to about 55 percent, from about 35 to about 55 percent, and from about 45 to about 55 percent of the total film thickness.

Barrier Layer

The film of the present invention may include one or more barrier layers between the first and second outer layers. A barrier layer reduces the transmission rate of one or more gases or vapors through the film. Accordingly, the barrier layer of a film that is made into a bag will help to exclude one or more gases or vapors from the interior of the bag—or conversely to maintain one or more gases or vapors within a bag. The barrier layer preferably has a thickness and includes components sufficient to impart to the film an oxygen transmission rate of no more than (in ascending order of preference) 500, 50, 20, 15, and 10 cubic centimeters (at standard temperature and pressure) per square meter per day per 1 atmosphere of oxygen pressure differential measured at 0% relative humidity and 23° C. All references to oxygen transmission rate in this application are measured at these conditions according to ASTM D-3985, which is incorporated herein in its entirety by reference.

Oxygen (i.e., gaseous 02) barrier layers may include one or more of the following polymers: ethylene/vinyl alcohol copolymer ("EVOH"), vinylidene chloride copolymers ("VDC"), polyalkylene carbonate, polyester (e.g., PET, PEN), polyacrylonitrile, and polyamide. EVOH may have an ethylene content of between about 20% and 40%, preferably between about 25% and 35%, more preferably about 32% by weight. EVOH includes saponified or hydrolyzed ethylene/vinyl acetate copolymers, such as those having a degree of hydrolysis of at least 50%, preferably of at least 85%. A barrier layer that includes VDC may also include a thermal stabilizer (e.g., a hydrogen chloride scavenger such as epoxidized soybean oil) and a lubricating processing aid (e.g., one or more acrylates). VDC includes crystalline copolymers, containing vinylidene chloride and one or more other monomers, including for example vinyl chloride, acrylonitrile, vinyl acetate, methyl acrylate, ethyl acrylate, ethyl methacrylate and methyl methacrylate.

A barrier layer may also be formed from a latex emulsion coating grade of vinylidene chloride/vinyl chloride copolymer having 5–15% vinyl chloride. The coating grade copolymer of vinylidene chloride/vinyl chloride may be present in an amount of from 5–100% (of total solids) with the remainder being 2–10% epoxy resin and melt extrusion grade material.

The barrier layer thickness may range from about (in order of ascending preference) 0.05 to 6 mils (1.27 to 152.4 micrometer), 0.05 to 4 mils (1.27 to 101.6 micrometer 0.1 to 3 mils (2.54 to 76.2 micrometer), and 0.12 to 2 mils (3.05 to 50.8 micrometer).

Tie Layers

A film according to the invention may include one or more tie layers, which have the primary purpose of improving the adherence of two layers to each other. Tie layers may include polymers having grafted polar groups so that the polymer is capable of covalently bonding to polar polymers such as EVOH. Useful polymers for tie layers include ethylene/ unsaturated acid copolymer, ethylene/unsaturated ester copolymer, anhydride-modified polyolefin, polyurethane, and mixtures thereof Preferred polymers for tie layers include one or more of ethylene/vinyl acetate copolymer having a vinyl acetate content of at least 15 weight %, ethylene/methyl acrylate copolymer having a methyl acrylate content of at least 20 weight %, anhydride-modified ethylene/methyl acrylate copolymer having a methyl acrylate content of at least 20%, and anhydride-modified ethylene/alpha-olefin copolymer, such as an anhydride grafted LLDPE.

Modified polymers or anhydride-modified polymers include polymers prepared by copolymerizing an unsaturated carboxylic acid (e.g., maleic acid, fumaric acid), or a derivative such as the anhydride, ester, or metal salt of the unsaturated carboxylic acid with—or otherwise incorporating the same into—an olefin homopolymer or copolymer. Thus, anhydride-modified polymers have an anhydride functionality achieved by grafting or copolymerization.

The film may include a tie layer directly adhered (i.e., directly adjacent) to one or both sides of an internal barrier layer. Further, a tie layer may be directly adhered to the internal surface of the second outer layer (i.e., an abuse layer). The tie layers are of a sufficient thickness to provide the adherence function, as is known in the art. Each tie layer may be of a substantially similar or a different composition and/or thickness.

Multiple Layer Film

The multiple layer film of the present invention may have any total thickness, so long as the film provides the desired properties (e.g. optics, secant modulus, seal strength, flexibility) for the particular packaging application of expected use (e.g., post packaging pasteurization). The film may have a total thickness of (in ascending order of preference) from about 0.5 to about 10 mils, from about 1 to about 5 mils, from about 1.3 to about 4 mils, from about 1.5 to about 3.5 mils, and from about 1.8 to about 2.5 mils.

The film may include any number of layers, preferably a total of from 3 to 20 layers, more preferably at least 4 layers, still more preferably at least 5 layers, and most preferably from 5 to 9 layers. Below are some examples of preferred combinations in which the alphabetical symbols designate the resin layers. Where the multilayer film representation below includes the same letter more than once, each occurrence of the letter may represent the same composition or a different composition within the class that performs a similar function.

A/B/D, A/B/C/D, A/C/B/D, A/B/C/E/D, A/B/E/C/D, A/C/B/E/D, A/C/E/B/D, A/E/B/C/D, A/E/C/B/D, A/C/B/C/D, A/B/C/B/D, A/B/C/E/B/D, A/B/C/E/C/D, A/B/E/C/B/D, A/C/E/C/B/D, A/B/C/B/B/D, A/C/B/B/B/D, A/C/B/C/B/D, A/C/E/B/B/D, A/B/E/C/E/B/D, A/B/E/C/E/B/E/D

"A" is the first outer layer or seal layer, which as discussed above may include one or more of polyolefins (e.g., ethylene homopolymers, such as high density polyethylene ("HDPE") and low density polyethylene ("LDPE"), ethylene copolymers, such as ethylene/ alpha-olefin copolymers, propylene/ethylene copolymers, and ethylene/vinyl acetate copolymers), polyamides, polyesters, polyvinyl chlorides, and ionomers.

"B" is a core layer, which as discussed above may include one or more ethylene/alpha-olefin copolymers.

"C" is a barrier layer, which as discussed above may include one or more of EVOH, VDC, polyalkylene carbonate, polyester (e.g., PET, PEN), polyacrylonitrile, and polyamide "D" is the second outer layer or abuse layer, which as discussed above may include one or more of the following thermoplastic gloss materials: i) polyester, ii) styrene-butadiene block copolymer, iii) ethylene/alpha-olefin copolymer having an MI of greater than 1 g/10 minutes, and iv) ethylene/styrene random copolymer.

"E" is a tie layer, which as discussed above may include one or more ethylene/unsaturated acid copolymers, ethylene/unsaturated ester copolymers, anhydride-modified polyolefins, and polyurethanes.

One or more of any of the layers of the multilayer film of the present invention may include appropriate amounts of additives typically included in food packaging films for the desired effect, as is know to those of skill in the packaging films art. For example, a layer may include additives such as slip agents (e.g., as talc), antiblock agents, antioxidants, fillers, pigments and dyes, radiation stabilizers, and antistatic agents.

Appearance Characteristics

The multilayer film of the present invention generally has appearance and optical characteristics that are comparable to those of barrier bag films—and that are generally more desirable than those of cook-in bag films. The measurement of optical properties of plastic films used in packaging, including the measurement of gloss, haze, and clarity (i.e., total light transmission) is discussed in detail in Pike, LeRoy, "Optical Properties of Packaging Materials," Journal of Plastic Film & Sheeting, Vol. 9, No. 3, pp. 173–180 (July 1993), which is incorporated herein in its entirety by reference.

The film of the present invention preferably has a gloss, as measured against the second outer layer of at least about (in ascending order of preference) 60%, 63%, 65%, 70%, 75%, 80%, 85%, and 90%. Also preferably, the second outer layer of the film includes an amount of a thermoplastic gloss material (discussed above) sufficient to impart to the second outer layer (in ascending order of preference) each of the preferred gloss levels listed in the previous sentence. All references to "gloss" values in this application are by ASTM D 2457 (45° angle), which is incorporated herein in its entirety by reference. Further, the film has low haze characteristics. Haze is also measured against the second outer layer, according to the method of ASTM D 1003, which is incorporated herein in its entirety by reference. All references to "haze" values in this application are by this standard. Preferably, the haze is no more than about (in ascending order of preference) 10%, 9%, 8%, 7%, and 6%.

Orientation, Heat Shrinkability

The multilayer film of the present invention may be oriented in either the machine or transverse direction, preferably in both directions (i.e., biaxially oriented), in order to improve the strength and durability of the film. Preferably, the film is oriented in at least one direction by a ratio of (in ascending order of preference) at least 2.5:1, from about 2.7:1 to about 10:1, at least 2.8:1, at least 2.9:1, at least 3.0:1, at least 3.1:1, at least 3.2:1, at least 3.3:1, at least 3.4:1, at least 3.5:1, at least 3.6:1, and at least 3.7:1.

Preferably, the film is heat shrinkable, having a total free shrink at 185° F. (85° C.) of (in ascending order of preference) at least 40%, at least 50%, at least 55%, at least 60%, and at least 65%. The total free shrink at 185° F. (85° C.) may also range (in ascending order of preference) from 40 to 150%, 50 to 140%, and 60 to 130%. The total free shrink is determined by summing the percent free shrink in the machine direction with the percentage of free shrink in the transverse direction. For example, a film which exhibits 50% free shrink in the transverse direction and 40% free shrink in the machine direction has a total free shrink of 90%. Although preferred, it is not required that the film have shrinkage in both directions. The free shrink of the film is determined by measuring the percent dimensional change in a 10 cm×10 cm film specimen when subjected to selected heat (i.e., at a certain temperature exposure) according to ASTM D 2732, which is incorporated herein in its entirety by reference.

As is known in the art, a heat-shrinkable film shrinks upon the application of heat while the film is in an unrestrained state. If the film is restrained from shrinking—for example by a packaged good around which the film shrinks—then the tension of the heat-shrinkable film increases upon the application of heat. Accordingly, a heat-shrinkable film that has been exposed to heat so that at least a portion of the film is either reduced in size (unrestrained) or under increased tension (restrained) is considered a heat-shrunk (i.e., heat-contracted) film. The film of the present invention may exhibit a shrink tension in at least one direction of (in ascending order of preference) at least 100 psi (689.6 kN/m2), 175 psi (1206.8 kN/m2), from about 175 to about 500 psi (1206.8 to 3448.0 kN/m2), from about 200 to about 500 psi (1379.2 to 3448.0 kN/m2), from about 225 to about 500 psi (1551.6 to 3448.0 kN/m2), from about 250 to about 500 psi (1724.0 to 3448.0 kN/m2), from about 275 to about 500 psi (1896.4 to 3448.0 kN/m2), from about 300 to about 500 psi (2068.8 to 3448.0 kN/m2), and from about 325 to about 500 psi (2241.2 to 3448.0 kN/m2). Shrink tension is measured at 185° F. (85° C.) in accordance with ASTM D 2838, which is incorporated herein in its entirety by reference.

The multilayer film of the present invention may be annealed or heat-set to reduce the free shrink either slightly, substantially, or completely; however, it is preferred that the film not be heat set or annealed once stretched in order that the film will have a high level of heat shrinkability.

One or more of the thermoplastic layers of the film of the present invention—or at least a portion of the entire film—may be cross-linked to improve the strength of the film, improve the orientation of the film, and help to avoid burn through during heat seal operations. Cross-linking may be achieved by using chemical additives or by subjecting the film layers to one or more energetic radiation treatments—such as ultraviolet, X-ray, gamma ray, beta ray, and high energy electron beam treatment—to induce cross-linking between molecules of the irradiated material. An electron accelerator may be used to provide an effective radiation dosage of high energy electrons. Preferably, the film is irradiated at a dosage level of from about 30 kGy to about 207 kGy, more preferably from about 30 kGy to about 140 kGy, measured by standard dosimetry methods.

Preferably, at least one of the core layers (e.g., the first internal layer) of the film is cross-linked—for example by irradiation—before the film is oriented. For example, where the film is manufactured by extrusion coating, one or more internal layers may be irradiated while one or more of the outer layers are not irradiated before orientation, as is known in the art and discussed below in conjunction with the Examples. Further, all of the layers (i.e., the entire film) may be irradiated before orientation, for example, where the film is manufactured using coextrusion methods known in the art.

Manufacture of the Film

The multiple layer film of the present invention may be prepared by coextrusion utilizing, for example, a tubular trapped bubble film process or a flat film (i.e., cast film or slit die) process. The film may also be prepared by extrusion coating. Alternatively, the film may be prepared by adhesively laminating the various layers. A combination of these processes may also be employed. These processes are well-known to those of skill in the art. For example, extrusion coating is described in U.S. Pat. No. 4,278,738 to Brax, which is incorporated herein by reference in its entirety. After the coextruded film is cooled, it may be irradiated, and subsequently oriented, for example, by the tentering, trapped bubble, or double bubble techniques known in the art. See, for example, U.S. Pat. No. 4,469,742 to Oberle entitled "Pasteurizable, Cook-In Shrink Film" (previously incorporated) and U.S. Pat. No. 5,759,648 to Idlas entitled "Multilayer Plastic Film, Useful for Packaging a Cook-In Foodstuff," of which column 14, line 40 to column 15, line 33 is incorporated herein by reference.

Use of the Film to Form a Post Pasteurization Bag

The film of the present invention may be formed into a bag such as a post pasteurization bag for packaging a food product (e.g., meat products and fresh red meat products such as poultry, pork, beef, sausage, lamb, goat, horse, and fish.). Suitable bag configurations include end-seal bag, side-seal bag, L-seal bag, pouch, and seamed casing. Such bag configurations are known to those of skill in the art. See, for example, U.S. Pat. No. 5,846,620 issued Dec. 8, 1998 to Compton, which is incorporated herein in its entirety by reference.

To use the bag in a post pasteurization process, a food product is inserted through the open top of the bag made from the film of the present invention. Preferably, the food product previously has been at least partially cooked. The bag is then closed, for example by a tie, clamp, or heat seal, preferably to form a hermetic seal. The packaged food product enclosed within the bag is then post pasteurized, for example by immersion in hot water bath or exposure to steam for an effective amount of time and at an effective temperature. Effective amounts of time for post pasteurization include at least (in ascending order of preference) 30 seconds, 1 minute, 2 minutes, 5 minutes, 10 minutes, and 20 minutes. Effective post pasteurization temperatures for the surface of the packaged food product include at least (in ascending order of preference) 70° C., 71° C., 75° C., 80° C., 90° C., and 99° C. Other means of post pasteurization include irradiation, pulsed light pasteurization, and high pressure pasteurization, as are known in the art. Preferably, this exposure simultaneously shrinks the bag tightly about the packaged food product, although the bulk of the shrink may occur either before or after post pasteurization.

The post pasteurization bag of the present invention may also be used in a method to impart a food modifier to a cooked food product. A processor may desire to use a food modifier, for example, to impart seasoning, color, flavor, glazing, or pleasing odor to the outer surface of the cooked food product. To do so, the processor first encloses the food product within a cook-in bag. The processor then cooks, or at least partially cooks, the food product within the cook-in bag, using cook-in methods and materials known to those of skill in the art. The processor then removes the cook-in bag from the cooked food product. Next, the processor applies a food modifier to the surface of the cooked food product. The processor then repackages or encloses the modified food product in a post packaging pasteurization bag formed from the film of the present invention. Then, the processor exposes the packaged modified cooked food product to conditions sufficient to pasteurize to a desired level at least the surface of the packaged modified cooked food product.

The following examples are presented for the purpose of further illustrating and explaining the present invention and are not to be taken as limiting in any regard. Unless otherwise indicated, all parts and percentages are by weight. In the examples, the following abbreviations are used:

"EPC-1" is an ethylene/propylene copolymer having a Vicat softening point of 120° C., a density of 0.900 g/cc, MI of 5.0 g/10 minutes, 3.2 weight % ethylene content, and melting point of 134° C.; and is sold by Solvay under the trademark Eltex P KS 409.

"VLDPE-1" is a single-site catalyzed (i.e., homogeneous) very low density polyethylene (ethylene/butene copolymer) having a density of about 0.9 g/cc and a MI of about 1.2 g/10 minute and is sold by Exxon under the trademark Exact 3128.

"LLDPE-1" is a single-site catalyzed LLDPE (ethylene/hexene copolymer) having a Vicat softening point of 103° C., a density of 0.917 g/cc, a MI of 4.5 g/10 minutes, and is sold by Exxon under the trademark Exceed 361C33.

"VLDPE-2" is a VLDPE (ethylene/octene copolymer) having a density of 0.905 g/cc, a melting point of 123° C., an octene comonomer content of 11.5 weight %, and a MI of 0.8 g/10 minutes; and is sold by Dow under the trademark Attane 4203.

"VLDPE-3" is a VLDPE (ethylene/octene copolymer) with a density of 0.904 g/cc and a MI of 4.0 g/10 minutes, and is sold by Dow under the trademark Attane 4404.

"LLDPE-2" is a LLDPE (ethylene/octene copolymer) having a Vicat softening point of 94° C., a density of 0.913 g/cc, an octene comonomer content of 9.0 weight %, and a MI of 3.1 g/10 minutes, and is sold by Dow under the trademark Attane 4202.

"LLDPE-3" is a LLDPE (ethylene/octene copolymer) having a Vicat softening point of 86° C., a density of 0.91 1 g/cc, a MI of 5.7 to 7.5 g/10 minutes, and an octene comonomer content of 16 to 19 weight %, and is sold by DSM under the trademark Stamylex 08-076F.

"Modified LLDPE-1" is an anhydride modified LLDPE with a density of 0.910 g/cc and a MI of 1.6 g/10 minutes, and is sold by Rohm & Haas under the trademark Tymor 1203.

"EVA-1" is an ethylene-vinyl acetate copolymer with a vinyl acetate comonomer content of 6.5 weight %, an MI of 0.5 g/10 minutes, and a density of 0.9315; and is sold by Chevron under the trademark PE5269 T.

"EVA-2" is an ethylene-vinyl acetate copolymer with a vinyl acetate comonomer content of 15 weight %, an MI of 3.6 g/10 minutes, and a density of 0.933 g/cc; and is sold by Exxon under the trademark Escorene LD-761.36 T.

"Modified EMA-1" is an anhydride grafted ethylene/methyl acrylate copolymer with a density of 0.931 g/cc and an MI of 2.8 g/10 minutes; and is sold by Dupont under the trademark BYNEL® 2174.

"EMA-1" is an ethylene/methyl acrylate copolymer with a density of 0.942 g/cc, an MI of 2.0 g/10 minutes, and a methyl acrylate comonomer content of 21.5 weight %; and is sold by Exxon under the trademark Opema TC110.

"EVOH-1" is an ethylene/vinyl alcohol copolymer and is sold by Eval of America under the trademark EVAL® LC-E105A.

"Polyester-1" is a homopolymer of polyethylene terephthalate having a density of 1.4 g/cc and is sold by Eastman Chemical under the trademark Eastapak Polyester 12822.

"VDC-1" is a vinylidene chloride/methacrylate copolymer having about 8.5 weight % methacrylate and sold by Dow Chemical under the product code XU 32034.06.

"SB-1" is a styrene-butadiene block copolymer containing about 75 weight % styrene monomer and 25 weight % butadiene monomer; having a density of 1.01 g/cc and a MI of 7.5 g/10 minutes; and is sold by Phillips under the trademark DK11.

"ES-1" is an ethylene/styrene random copolymer containing about 70 weight % styrene monomer, having a melt index of about 1.0 g/10 minutes; and is sold by Dow Chemical Company as part of their Index S series resins.

The experimental films were made using one of two methods known to those of skill in the art: i) coextrusion and ii) extrusion coating. Examples 1–2 and 6 used the coextrusion method described below; whereas, Examples 3–5 used the extrusion coating method described below. The extrusion coating method is used to avoid irradiating the VDC oxygen barrier layer of Examples 3–5, which may degrade if irradiated, In both methods, solid polymer beads of the resins—other than the resins that may subsequently be applied by a coating step (e.g., the VDC oxygen barrier resins)—were fed to a plurality of extruders, where the polymer beads are forwarded, melted, and degassed. The resulting bubble-free melt was forwarded into a die head and extruded through an annular die to produce a tubing about 10 to 20 mils (254 to 508 micrometers) thick. The tubing was cooled or quenched by water spray using a cooling ring. The tubing was then collapsed by pinch rolls, and was fed through an irradiation vault surrounded by shielding, where the tubing was irradiated with high energy electrons (i.e., ionizing radiation) from an iron core transformer accelerator. The tubing was irradiated to a level of from about 40 kGy to about 120 kGy.

It is at this point that the extrusion coating method adds processing steps that are additional to that of the coextrusion method. For the extrusion coating method, the irradiated tube was directed through pinch rolls and slightly inflated to form a trapped bubble. The inflated tubing was not significantly drawn longitudinally and was inflated only enough to provide a substantially circular tubing without significant transverse orientation (i.e., without stretching). The slightly inflated, irradiated tubing was passed through a vacuum chamber and forwarded through a coating die. Annular coating streams of the oxygen barrier layer through the outside layer were melt extruded from the coating die and coated onto the slightly inflated, irradiated tube to form a two-ply tubular film. Thus, the $O_2$-barrier layer resin did not pass through the ionizing radiation. Further details of the above-described coating step are generally set forth in the previously cited U.S. Pat. No. 4,278,738 to Brax.

At this point, both methods again follow similar paths. After irradiation (and coating, for the extrusion coating method), the tubing film was passed into a hot water bath tank. The collapsed, irradiated film was immersed in hot water having a temperature of from about 185 to 210° F. (85 to 99° C.) for from about 10 to about 100 seconds in order to raise the film temperature fo biaxial orientation. The heated tubular film was stretched longitudinally and transversely stretched using a trapped bubble. While being stretched, nip rolls pulled tubular film in the longitudinal direction to produce an biaxially-oriented tubular film. The oriented tubular film was stretched in a ratio of about 3:1 and drawn at a ratio of about 3:1, resulting in a biaxial orientation of about 9:1.

EXAMPLE 1

An eight-layer, 2.4 mil thick heat-shrinkable film ("Film No. 1") was produced by coextruding the resins set forth below to produce a film having the layers in the order and amounts specified in Table I.

TABLE I (Film No. 1)

| Layer No. | Layer Function | Layer Resin | Layer Thickness (% of total thickness) |
|---|---|---|---|
| first (outer) | heat seal, product-contact, and inside bag layer | EPC-1 | 20% |
| second | shrink and abuse | VLDPE-1 | 25% |
| third | tie | Modified LLDPE-1 | 6% |
| fourth | $O_2$-barrier | EVOH-1 | 7% |
| fifth | tie | Modified LLDPE-1 | 6% |
| sixth | orientation | EVA-1 | 25% |
| seventh | tie | Modified EMA-1 | 6% |
| eighth (outer) | heat-resistance, abuse, and optics-enhancing layer; outside layer | Polyester-1 | 5% |

EXAMPLE 2

A seven-layer, 2.4 mil thick heat-shrinkable film ("Film No. 2") was produced by coextruding the resins set forth below to produce a film having the layers in the order and amounts specified in Table II.

TABLE II (Film No. 2)

| Layer No. | Layer Function | Layer Resin | Layer Thickness (% of total thickness) |
|---|---|---|---|
| first (outer) | heat seal, product-contact, and inside bag layer | LLDPE-1 | 22% |
| second | shrink and abuse | VLDPE-2 | 27% |
| third | tie | Modified LLDPE-1 | 6% |
| fourth | $O_2$-barrier | EVOH-1 | 7% |
| fifth | tie | Modified LLDPE-1 | 6% |
| sixth | orientation | EVA-1 | 22% |
| seventh (outer) | heat-resistance, abuse, and optics-enhancing layer; outside layer | VLDPE-3 | 10% |

EXAMPLE 3

Comparative

A seven-layer, 2.4 mil thick heat-shrinkable film ("Film No. 3") was formed from the resins set forth below using the extrusion coating method to produce a film having the layers in the order and amounts specified in Table III.

TABLE III (Film No. 3 - Comparative)

| Layer No. | Layer Function | Layer Resin | Layer Thickness (% of total thickness) |
|---|---|---|---|
| first (outer) | heat seal, product-contact, and inside bag layer | LLDPE-2 | 17% |
| second | shrink and abuse | VLDPE-2 | 39% |
| third | tie | EVA-2 | 5% |
| fourth | $O_2$-barrier | VDC-1 | 9% |
| fifth | tie | EMA-2 | 5% |
| sixth | orientation | VLDPE-2 | 18% |
| seventh (outer) | heat-resistance, abuse, and optics-enhancing layer; outside layer | VLDPE-3 | 7% |

EXAMPLE 4

A seven-layer, 2.4 mil thick heat-shrinkable film ("Film No. 4") was formed from the resins set forth below using the extrusion coating method to produce a film having the layers in the order and amounts specified in Table IV.

TABLE IV (Film No. 4)

| Layer No. | Layer Function | Layer Resin | Layer Thickness (% of total thickness) |
|---|---|---|---|
| first (outer) | heat seal, product-contact, and inside bag layer | EPC-1 | 17% |
| second | shrink and abuse | VLDPE-2 | 39% |
| third | tie | EVA-2 | 5% |
| fourth | $O_2$-barrier | VDC-1 | 9% |
| fifth | tie | EMA-2 | 5% |
| sixth | orientation | VLDPE-2 | 18% |

TABLE IV-continued (Film No. 4)

| Layer No. | Layer Function | Layer Resin | Layer Thickness (% of total thickness) |
|---|---|---|---|
| seventh (outer) | heat-resistance, abuse, and optics-enhancing layer; outside layer | VLDPE-3 | 7% |

EXAMPLE 5

Comparative

A seven-layer, 2.4 mil thick heat-shrinkable film ("Film No. 5") was formed from the resins set forth below using the extrusion coating method to produce a film having the layers in the order and amounts specified in Table V.

TABLE V (Film No. 5 - Comparative)

| Layer No. | Layer Function | Layer Resin | Layer Thickness (% of total thickness) |
|---|---|---|---|
| first (outer) | heat seal, product-contact, and inside bag layer | LLDPE-3 | 17% |
| second | shrink and abuse | VLDPE-2 | 39% |
| third | tie | EVA-2 | 5% |
| fourth | $O_2$-barrier | VDC-1 | 9% |
| fifth | tie | EMA-2 | 5% |
| sixth | orientation | VLDPE-2 | 18% |
| seventh (outer) | heat-resistance, abuse, and optics-enhancing layer; outside layer | VLDPE-3 | 7% |

EXAMPLE 6

An eight-layer, 2.4 mil thick heat-shrinkable film ("Film No. 6") was produced by coextruding the resins set forth below to produce a film having the layers in the order and amounts specified in Table VI.

TABLE VI (Film No. 6)

| Layer No. | Layer Function | Layer Resin | Layer Thickness (% of total thickness) |
|---|---|---|---|
| first (outer) | heat seal, product-contact, and inside bag layer | EPC-1 | 20% |
| second | shrink and abuse | VLDPE-1 | 25% |
| third | tie | Modified LLDPE-1 | 6% |
| fourth | $O_2$-barrier | EVOH-1 | 7% |
| fifth | tie | Modified LLDPE-1 | 6% |
| sixth | orientation | EVA-1 | 25% |
| seventh | tie | Modified EMA-1 | 6% |
| eighth (outer) | heat-resistance, abuse, and optics-enhancing layer; outside layer | SB-1 | 5% |

Comparison Cook-In Example

Each of the Film Nos. 1–6 were compared to a cook-in bag film sold by the Cryovac Packaging Division of Sealed Air Corporation under the trademark CN530 ("Comparative Cook-In Film"). The Comparative Cook-In Film is a 2.4 mil thick, heat-shrinkable, multiple layer film. The outer seal layer is an is a propylene/ethylene copolymer having a Vicat softening point of 120° C. The outer abuse layer is a blend of ethylene/vinyl acetate copolymer and high density polyethylene. The internal oxygen barrier layer is an ethylene/vinyl alcohol copolymer. The total free shrink at 185° F .(85° C.), gloss, and haze of each bag film was measured according to the relevant ASTM tests discussed above. Table VII shows these values.

Next, ten end seal bags were made from each of Films Nos. 1–6 and the Comparative Cook-In Film by forming an about 0.25 inch (6.35 mm) wide heat seal at the end of the bag. Each bag averaged 9 inches wide by 16 inches long (228.6 by 406.4 mm). Each bag was filled with a combination of water and 5cc of mineral oil (to simulate the grease that may be expressed from a packaged food product) at room temperature. After filling, the top of each bag was sealed closed by a metal clip.

To simulate post-packaging pasteurization, each sealed, filled bag was placed for 10 minutes in a container of near-boiling water (99–100° C.) that had a rotating paddle at the bottom of the container to stir the water (i.e., the "steam-kettle test with paddle rotation"). The bags were also moved through the kettle by contact with the paddles. After 10 minutes exposure to the simulated post pasteurization conditions, each bag was placed all in an ice water bath for 15 minutes. A heat seal was considered a failure if during the comparison test the heat seal delaminated or otherwise became detached or the filled bag leaked. During this period, each bag was checked for failure of the heat seal at 2.5, 5.0, and 10.0 minutes and also upon removal from the ice-water bath. The failure rate of the bag seals are shown in Table VII.

TABLE VII

| Film | Vicat Softening Point of Seal Layer (° C.) | Melting Point of the Seal Layer (° C.) | Total Seal Failures (%) | Total Free Shrink (%) | Gloss (%) | Haze (%) |
|---|---|---|---|---|---|---|
| Comparative Cook-In Film | 120 | 134 | 0 | 50 | 60 | 11 |
| Film No. 1 | 120 | 134 | 0 | 65 | 92 | 5.0 |
| Film No. 2 | 103 | 115 | 0 | 63 | 64 | 8.1 |
| Film No. 3 (Comparative) | 94 | 125 | 60 | 65 | 65 | 7.5 |
| Film No. 4 | 120 | 134 | 0 | 65 | 65 | 9.0 |
| Film No. 5 (Comparative) | 86 | 102 | 100 | 66 | 65 | 6.0 |
| Film No. 6 | 120 | 134 | 0 | 63 | 85 | 5.9 |

The heat seals of the bags formed from the Comparative Cook-In Film and Films Nos. 1–2, 4, and 6 survived the simulated post pasteurization without failure. However, the heat seals of comparative Film Nos. 3 and 5 having heat seal layer with Vicat softening points of 94° C. and 86° C., respectively, failed under the simulated post pasteurization. This was true even though the melting point of each of these seal layers (125° C. and 102° C., respectively) was above the near 100° C. temperature of the simulated post pasteurization. The total free shrink for each of Film Nos. 1–6 was about the same, indicating that the tension force on the heat seals of each film was also about the same—so that a difference in the tension on the heat seals did not account for the failure variance. It was also determined that although the heat seals of bags having a seal layer with a Vicat softening point below 100° C. survived the simulated post pasteurization for less than 10 minutes—a Vicat softening point of at least 100° C. was important for a viable heat seal for at least 10 minutes during the post pasteurization.

Importantly, the Films Nos. 1–2, 4, and 6 each had far more desirable total free shrink and optical characteristics than those of the Comparative Cook-In Film. Each of the Films Nos. 1–2, 4, and 6 displayed much higher total free shrink and gloss values—while providing a far lower haze—than these characteristics for the Comparative Cook-In Film.

EXAMPLE 7

An eight-layer, 2.4 mil thick heat-shrinkable film ("Film No. 7") is produced by. coextruding the resins set forth below to produce a film having the layers in the order and amounts specified in Table VIII.

TABLE VIII (Film No. 7)

| Layer No. | Layer Function | Layer Resin | Layer Thickness (% of total thickness) |
|---|---|---|---|
| first (outer) | heat seal, product-contact, and inside bag layer | EPC-1 | 20% |
| second | shrink and abuse | VLDPE-1 | 25% |
| third | tie | Modified LLDPE-1 | 6% |
| fourth | $O_2$-barrier | EVOH-1 | 7% |
| fifth | tie | Modified LLDPE-1 | 6% |
| sixth | orientation | EVA-1 | 25% |
| seventh | tie | Modified EMA-1 | 6% |
| eighth (outer) | heat-resistance, abuse, and optics-enhancing layer; outside layer | ES-1 | 5% |

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. All references to ASTM tests are to the most recent, currently approved, and published version of the ASTM test identified, as of the priority filing date of this application. Each such published ASTM test method is incorporated herein in its entirety by this reference.

What is claimed is:

1. A multilayer heat-shrinkable film comprising:
   a first outer layer formed from a resin composition having a Vicat softening point of at least 100° C.;
   a second outer layer including one or more thermoplastic gloss materials selected from the group consisting of polyester, ethylene/alpha-olefin copolymer having a melt index of greater than 1 g/10 minutes, styrene/butadiene block copolymer, and ethylene/styrene random copolymer; and
   one or more inner layers between the first and second outer layers, at least one of the inner layers including an ethylene/α-olefin copolymer, wherein:
   the multilayer film has a total free shrink of at least 40% at 85° C.; and
   if the second outer layer includes a given amount by weight of polyester, then: i) each of the inner layers of the multilayer film is devoid of an amount by weight of polyamide greater than the given amount by weight of polyester in the second outer layer and ii) each of the inner layers of the multilayer film is devoid of an amount by weight of polyester greater than the given amount by weight of polyester in the second outer layer.

2. The film of claim 1 wherein the second outer layer includes an amount of the gloss material sufficient to impart a gloss of greater than 60% as measured against the second outer layer by ASTM D2457 (45° angle).

3. The film of claim 1 wherein at least one inner layer includes an ethylene/alpha-olefin having a density of from about 0.89 to about 0.93 g/cm3.

4. The film of claim 1 wherein at least one layer is cross-linked.

5. The film of claim 1 wherein the second outer layer consists essentially of the one or more thermoplastic gloss materials.

6. The film of claim 1 wherein the second outer layer includes polyester and the total weight of polyamide in the inner layers of the multilayer film and the total weight of polyester in the inner layers of the multilayer film are each less than the given weight of polyester in the second outer layer.

7. The film of claim 1 wherein the second outer layer includes polyester and the inner layers of the multilayer film are substantially free of polyamide.

8. The film of claim 1 wherein the second outer layer includes polyester and the multilayer film is substantially free of polyamide.

9. The film of claim 1 wherein the second outer layer includes polyester and the inner layers of the multilayer film are substantially free of polyester.

10. The film of claim 1 wherein the second outer layer includes polyester and the layers of the multilayer film other than the second outer layer are substantially free of polyester.

11. The film of claim 1 wherein the second outer layer includes polyester and the second outer layer is no more than 25% of the total thickness of the multilayer film.

12. The film of claim 1 wherein the second outer layer includes polyester and the second outer layer is no more than 15% of the total thickness of the multilayer film.

13. The film of claim 1 wherein the second outer layer includes ethylene/alpha-olefin copolymer having a melt index of greater than 1 g/10 minutes as measured by ASTM D1238 (Condition E).

14. The film of claim 1 wherein the second outer layer includes ethylene/alpha-olefin copolymer having a melt index of at least 1.2 g/10 minutes as measured by ASTM D1238 (Condition E).

15. The film of claim 1 wherein the second outer layer includes a styrene-butadiene block copolymer.

16. The film of claim 1 wherein the second outer layer includes an ethylene/styrene random copolymer.

17. The film of claim 1 further comprising a second inner layer between the first and second outer layers, the second inner layer having a thickness and composition of thermoplastic material sufficient to impart to the multilayer film an oxygen gas transmission rate of no more than 500 cubic centimeters (at standard temperature and pressure) per square meter per day per 1 atmosphere of oxygen pressure differential measured at 0% relative humidity and 23° C.

18. The film of claim 17 wherein the second inner layer has a thickness and composition of thermoplastic material sufficient to impart to the multilayer film an oxygen gas transmission rate of no more than 50 cubic centimeters (at standard temperature and pressure) per square meter per day per 1 atmosphere of oxygen pressure differential measured at 0% relative humidity and 23° C.

19. The film of claim 17 wherein the second inner layer includes a thermoplastic material selected from the group consisting of ethylene/vinyl alcohol copolymer, vinylidene chloride copolymers, and mixtures thereof.

20. The film of claim 17 wherein the multilayer film has a total free shrink of at least about 60% at 85° C.

21. The film of claim 17 wherein the first outer layer is formed from a resin composition having a Vicat softening point of at least 110° C.

22. The film of claim 17 wherein the first outer layer is formed from a resin composition having a Vicat softening point of at least 120° C.

23. The film of claim 17 wherein at least one layer is cross-linked.

24. The film of claim 17 further comprising a third inner layer directly adjacent the second inner layer, the third inner layer including a polymer selected from the group consisting of ethylene/unsaturated acid copolymer, ethylene/unsaturated ester copolymer, anhydride-modified polyolefin, polyurethane, and mixtures thereof.

25. The film of claim 24 wherein the third inner layer includes a polymer selected from the group consisting of ethylene/vinyl acetate copolymer having a vinyl acetate content of at least 15 weight %, ethylene/methyl acrylate copolymer having a methyl acrylate content of at least 20 weight %, anhydride-modified ethylene/methyl acrylate copolymer having a methyl acrylate content of at least 20%, and anhydride-modified ethylene/alpha-olefin copolymer, and mixtures thereof.

26. The film of claim 17 further comprising a third inner layer directly adjacent the second outer layer, the third inner layer including a polymer selected from the group consisting of ethylene/vinyl acetate copolymer having a vinyl acetate content of at least 15 weight %, ethylene/methyl acrylate copolymer having a methyl acrylate content of at least 20 weight %, anhydride-modified ethylene/methyl acrylate copolymer having a methyl acrylate content of at least 20%, and anhydride-modified ethylene/alpha-olefin copolymer, and mixtures thereof.

27. The film of claim 26 further comprising a fourth inner layer directly adjacent the second inner layer, the fourth inner layer including a polymer selected from the group consisting of ethylene/vinyl acetate copolymer having a vinyl acetate content of at least 15 weight %, ethylene/methyl acrylate copolymer having a methyl acrylate content of at least 20 weight %, anhydride-modified ethylene/methyl acrylate copolymer having a methyl acrylate content of at least 20%, and anhydride-modified ethylene/alpha-olefin copolymer, and mixtures thereof.

28. The film of claim 17 wherein:
   the second outer layer includes a styrene/butadiene block copolymer;
   the inner layer including an ethylene/alpha-olefin copolymer is a first inner layer; and
   the second outer layer is directly adjacent the first or the second inner layer.

29. A food package comprising a bag formed from materials including the film of claim 1.

30. A method of pasteurization comprising:
   forming a bag from the film of claim 1;
   enclosing a food product within the bag to create a packaged food product; and
   exposing the packaged food product to conditions sufficient to pasteurize at least the surface of the packaged food product to a desired level.

31. The method of claim 30 further comprising at least partially cooking the food product before the enclosing step.

32. The method of claim 31 wherein the exposing step includes elevating the temperature of the surface of the packaged food product to at least 70° C. for at least 30 seconds.

33. A method of imparting a food modifier to a cooked food product, the method comprising:
   enclosing a food product in a cook-in bag to form a packaged food product;
   at least partially cooking the packaged food product in the cook-in bag to form a cooked food product;
   removing the cook-in bag from the cooked food product;
   applying a food modifier to the cooked food product to form a modified, cooked food product;
   forming a post-packaging pasteurization bag from the film of claim 1;
   enclosing the modified, cooked food product within the post-packaging pasteurization bag to create a packaged modified cooked food product; and
   exposing the packaged modified cooked food product to conditions sufficient to pasteurize at least the surface of the packaged modified cooked food product to a desired level.

* * * * *